United States Patent
Bonsall

(10) Patent No.: US 11,247,133 B1
(45) Date of Patent: Feb. 15, 2022

(54) SYSTEM AND METHOD FOR FACILITATING MANAGEMENT OF MULTIYEAR OWNERSHIP RIGHTS IN FANTASY SPORTS LEAGUE GAMEPLAY

(71) Applicant: Jason M. Bonsall, Mint Hill, NC (US)

(72) Inventor: Jason M. Bonsall, Mint Hill, NC (US)

( * ) Notice: Subject to any disclaimer, the term of this patent is extended or adjusted under 35 U.S.C. 154(b) by 115 days.

(21) Appl. No.: 16/698,861

(22) Filed: Nov. 27, 2019

Related U.S. Application Data

(60) Provisional application No. 62/772,595, filed on Nov. 28, 2018.

(51) Int. Cl.
| | |
|---|---|
| *A63F 13/85* | (2014.01) |
| *A63F 13/828* | (2014.01) |
| *H04L 29/06* | (2006.01) |
| *A63F 13/60* | (2014.01) |
| *G06F 3/0482* | (2013.01) |

(52) U.S. Cl.
CPC ............ *A63F 13/828* (2014.09); *A63F 13/60* (2014.09); *A63F 13/85* (2014.09); *H04L 67/38* (2013.01); *A63F 2300/8052* (2013.01); *G06F 3/0482* (2013.01)

(58) Field of Classification Search
CPC ........ A63F 13/828; A63F 13/60; A63F 13/85; G06F 3/0482
See application file for complete search history.

(56) References Cited

U.S. PATENT DOCUMENTS

| | | | | |
|---|---|---|---|---|
| 2011/0319171 | A1* | 12/2011 | Ngozika | A63F 13/79 463/42 |
| 2012/0289340 | A1* | 11/2012 | Pawson | A63F 13/46 463/42 |
| 2013/0060361 | A1* | 3/2013 | Gabrail | A63F 13/58 700/91 |
| 2017/0232350 | A1* | 8/2017 | Carrillo | A63F 13/35 463/42 |

OTHER PUBLICATIONS

Reality_Sports_Online_Realistic_League_Management_Strategy_4for4.pdf, Brandon Niles, pp. 1-9. Year: 2015.*
Yahoo Fantasy Football My Team Roster, Oct. 2, 2018, (2 pages).

* cited by examiner

*Primary Examiner* — David L Lewis
*Assistant Examiner* — Shauna-Kay Hall
(74) *Attorney, Agent, or Firm* — Tillman, Wright & Wolgin; James D. Wright; Jeremy C. Doerre

(57) ABSTRACT

A computer implemented system and method for facilitating management of multiyear ownership rights in fantasy sports league gameplay, including displaying an interface of a fantasy sports league management website that includes a contract management user interface element for accessing a contract management interface; receiving input, displaying a contract management interface of the fantasy sports league management website that includes one or more user input elements configured to allow a user to select a player and specify a contract duration and contract amount for such selected player; receiving a contract proposal; prompting the respective user to vote yes/no for the contract; receiving (Continued)

input representing a vote of yes or no for the contract; and electronically determining that the contract should become official; and automatically counting the first contract amount for the first contract against a total salary amount of the first fantasy team.

18 Claims, 17 Drawing Sheets

FIG. 2

ABC Fantasy › Football '18  League  My Team  Matchups  Players  Research  Draft  Commissioner  StatTracker  Fantasy Shop Roster  Player Updates  Watch List  Team Log  Edit Team Info

Drunken Master ˅
Jason  Since '06  View Profile
2ND PLACE  TOTAL POINTS  POINTS/WEEK
3-1-0  378.92  94.73

○ LEVEL GOLD ●
Rating: 746 (+22)
Best Season Finish: Gold (5x)
Record: 134-108-3
Winning %: .553

WEEK 4 MATCHUP
96.66  61.24
vs RumpleForeskin 1-3-0  12th

Week 4 Results
Won 96.66 – 61.24
Vs RumpleForeskin

The Deeper League
Edit League ●

Drunken Master (2018)

Add Contract  ↻
Team Budget $200.00

| Player | Team | Position | Contract Year | 2019 | 2020 | 2021 | 2022 | 2023 | 2024 | 2025 |
|---|---|---|---|---|---|---|---|---|---|---|
| Patrick Mahomes | KC | QB | 2018 | $6 | $6 | $6 | $6 | $6 | | |
| Odell Beckham Jr. | NYG | WR | 2017 | $50 | $50 | | | | | |
| Stefon Diggs | Min | WR | 2017 | $18 | $18 | | | | | |
| Allen Robinson II | Chi | WR | 2017 | $14 | | | | | | |
| Tevin Coleman | Atl | RB | 2017 | $11 | $11 | $11 | | | | |
| Dion Lewis | Ten | RB | ◊ | | | | | | | |
| Jimmy Graham | GB | TE | 2017 | $37 | $37 | $37 | | | | |
| Amari Cooper | Oak | WR | ◊ | | | | | | | |
| Chris Thompson | Was | RB | 2017 | $11 | $11 | $11 | $11 | | | |
| Robby Anderson | NYJ | WR | ◊ | | | | | | | |
| Andrew Luck | Ind | QB | 2017 | $11 | $11 | $3 | $3 | $3 | | |
| David Njoku | Cle | TE | ◊ | | | | | | | |
| Duke Johnson Jr. | Cle | RB | 2017 | $3 | $3 | | | | | |
| James Washington | Pit | WR | 2017 | $11 | $11 | | | | | |
| Philadelphia | Phi | DEF | ◊ | | | | | | | |
| Marlon Mack | Ind | RB | ◊ | | | | | | | |
| | | | Current | $161 | $147 | $68 | $20 | $9 | $0 | $0 |
| | | | Pending | $161 | $147 | $68 | $20 | $9 | $0 | $0 |

Pending Contracts

ABC Fantasy ▾ | Football '18 League My Team Matchups Players Research Draft Commissioner StatTracker Fantasy Shop Roster  Player Updates  Watch List  Team Log  Edit Team Info

Drunken Master ▾
Jason  Since '06  View Profile
2ND PLACE  TOTAL POINTS  POINTS/WEEK
3-1-0  378.92  94.73

● LEVEL GOLD ●
Rating: 746 (+22)
Best Season Finish: Gold (5x)
Record: 134-108-3
Winning %: .553

WEEK 4 MATCHUP
96.66  61.24
vs RumpleForeskin 1-3-0  12th

Week 4 Results
Won 96.66 – 61.24
Vs RumpleForeskin

The Deeper League
Edit League

Drunken Master (2018)

Add Contract
Team Budget $200.00

| Player | Team | Position | Contract Year | 2019 | 2020 | 2021 | 2022 | 2023 | 2024 | 2025 |
|---|---|---|---|---|---|---|---|---|---|---|
| Patrick Mahomes | KC | QB | 2018 | $6 | $6 | $6 | $6 | $6 | | |
| Odell Beckham Jr. | NYG | WR | 2017 | $50 | $50 | | | | | |
| Stefon Diggs | Min | WR | 2017 | $18 | $18 | | | | | |
| Allen Robinson II | Chi | WR | 2017 | $14 | | | | | | |
| Tevin Coleman | Atl | RB | 2017 | $11 | $11 | $11 | | | | |
| Dion Lewis | Ten | RB | ◊ | | | | | | | |
| Jimmy Graham | GB | TE | ◊ | | | | | | | |
| Amari Cooper | Oak | WR | 2017 | $37 | $37 | $37 | | | | |
| Chris Thompson | Was | RB | ◊ | | | | | | | |
| Robby Anderson | NYJ | WR | 2017 | $11 | $11 | $11 | $11 | | | |
| Andrew Luck | Ind | QB | ◊ | | | | | | | |
| Baker Mayfield | Cle | QB | 2018 | $3 | $3 | $3 | $3 | $3 | | |
| Duke Johnson Jr. | Cle | RB | 2017 | $11 | $11 | | | | | |
| James Washington | Pit | WR | ◊ | | | | | | | |
| Philadelphia | Phi | DEF | ◊ | | | | | | | |
| Marlon Mack | Ind | RB | ◊ | | | | | | | |
| | | | Current | $161 | $147 | $68 | $20 | $9 | $0 | $0 |
| | | | Pending | $161 | $147 | $68 | $20 | $9 | $0 | $0 |

Pending Contracts

FIG. 13B

ABC Fantasy ∨ | Football '18  League  My Team  Matchups  Players  Research  Draft  Commissioner  StatTracker  Fantasy Shop Roster  Player Updates  Watch List  Team Log  Edit Team Info

Drunken Master ∨
Jason  Since '06  View Profile
2ND PLACE  TOTAL POINTS  POINTS/WEEK
3-1-0  378.92  94.73

○ LEVEL GOLD ●
Rating: 746 (+22)
Best Season Finish: Gold (5x)
Record: 134-108-3
Winning %: .553

WEEK 4 MATCHUP
96.66  61.24
vs RumpleForeskin 1-3-0  12th

Week 4 Results
Won 96.66 – 61.24
Vs RumpleForeskin

The Deeper League
Edit League

Beer Run (2018)

Pending Contracts

Add Contract  ○
Team Budget $200.00

| Player | Team | Position | Contract Year | 2019 | 2020 | 2021 | 2022 | 2023 | 2024 | 2025 |
|---|---|---|---|---|---|---|---|---|---|---|
| Aaron Rodgers | GB | QB | 2018 | $21 | $21 | | | | | |
| Jarvis Landry | Cle | WR | 2018 | $12 | $12 | $12 | $12 | | | |
| Nelson Agholor | Phi | WR | 2017 | $12 | $12 | $12 | | | | |
| Jamison Crowder | Was | WR | ○ | | | | | | | |
| Kareem Hunt | KC | RB | 2018 | $44 | $44 | $44 | $44 | | | |
| Kenyon Johnson | Det | RB | ○ | | | | | | | |
| O.J. Howard | TB | TE | 2018 | $6 | $6 | $6 | $6 | | | |
| Golden Tate | Det | WR | ○ | | | | | | | |
| Mike Evans | TB | WR | 2018 | $45 | $45 | $45 | $45 | $45 | | |
| David Njoku | Cle | TE | 2017 | $3 | $3 | $3 | $3 | $3 | | |
| Philip Rivers | LAC | QB | ○ | | | | | | | |
| Theo Riddick | Det | RB | ○ | | | | | | | |
| Ty Montgomery | GB | RB | ○ | | | | | | | |
| Jakeem Grant | Mia | WR | ○ | | | | | | | |
| Seattle | Sea | DEF | | | | | | | | |
| Rex Burkhead | NE | RB | | | | | | | | |
| | | | Current | $143 | $143 | $122 | $122 | $48 | $0 | $0 |
| | | | Pending | $143 | $143 | $122 | $122 | $48 | $0 | $0 |

FIG. 14

| Teams | | | | | | | | | |
|---|---|---|---|---|---|---|---|---|---|
| Manager | Team Name | 2019 | 2020 | 2021 | 2022 | 2023 | 2024 | 2025 | |
| Jason | Drunken Master | $161 | $147 | $68 | $20 | $9 | $0 | $0 | Go |
| Jake | Slap A Nipple On It | $63 | $0 | $0 | $0 | $0 | $0 | $0 | Go |
| Brandon | Beer Run | $143 | $143 | $122 | $122 | $48 | $0 | $0 | Go |
| Justin | Thanks Kev | $75 | $41 | $19 | $0 | $0 | $0 | $0 | Go |
| Nathan | Dracarys | $52 | $52 | $0 | $0 | $0 | $0 | $0 | Go |
| Patrick | Fiesty Goats | $61 | $51 | $0 | $0 | $0 | $0 | $0 | Go |
| Ricky | Lickin | $91 | $67 | $0 | $0 | $0 | $0 | $0 | Go |
| Daniel | GFYS Gordddddddd | $30 | $21 | $8 | $0 | $0 | $0 | $0 | Go |
| Aaron | Brady's over the hit | $128 | $114 | $41 | $19 | $0 | $0 | $0 | Go |
| AL | TyBoyd Fever | $119 | $52 | $34 | $11 | $0 | $0 | $0 | Go |
| Chris | RumpleForeskin | $107 | $91 | $87 | $38 | $0 | $0 | $0 | Go |
| Kev | The Most | $153 | $98 | $69 | $39 | $0 | $0 | $0 | Go |
| | | $1183 | $877 | $448 | $249 | $57 | $0 | $0 | |

SYSTEM AND METHOD FOR FACILITATING MANAGEMENT OF MULTIYEAR OWNERSHIP RIGHTS IN FANTASY SPORTS LEAGUE GAMEPLAY

CROSS-REFERENCE TO RELATED APPLICATION

The present application is a U.S. nonprovisional patent application of, and claims priority under 35 U.S.C. § 119(e) to, U.S. provisional patent application 62/772,595, filed Nov. 28, 2018, which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to fantasy sports leagues, and, in particular, to gameplay involving multiyear ownership rights in fantasy sports leagues.

Background

Fantasy sports leagues have been formed and enjoyed for decades and are well known and understood. In a fantasy sports league, a group of participants assemble virtual teams of real players (or groups of players, such as a team defense as a whole) in an organized sport. The participants compete against each other via the statistical performance of the players on their respective teams.

Most commonly, fantasy sports leagues are played on a seasonal basis, wherein the players on the teams are selected at the beginning of the season for the sport. Different selection means have been employed, but typically the players are selected either in a draft format, an auction format, or a hybrid format. Traditionally, fantasy drafts for seasonal leagues work by assigning a draft order to all team owners in the league. When a team's turn in the draft order comes, a team owner or team representative (referred to generally herein as a "team owner") selects a player from the pool of available (as-yet-undrafted) players, making the selected player a member of that owner's team. Typically, the available players are those that have not yet been drafted, although more complicated rules may be utilized to define those players considered "available." Alternatively, in an auction format, team owners typically take turns nominating players on which all owners in the league may bid. The owners begin with a pre-established budget and the highest bid on each nominated player determines the team to which the player is assigned. One hybrid format is the use of a predetermined financial value for each player, with owners being assigned a budget which they may use to select players at the predetermined value. For the sake of simplicity, all formats are sometimes referred to herein as "drafts."

Notably, although fantasy sports leagues are generally played on a seasonal basis, many leagues incorporate a multi-season component by allowing an owner to maintain an ownership right of some sort from one season to the next. In these leagues, commonly referred to as "keeper leagues," some players are/may be selected, by one or another means, to remain assigned to the same team from one season to the next without reentering the draft pool and becoming available to other teams. Decisions of which players to keep are generally made within a few weeks of the next season's draft. Both player selection formats allow for leagues to be structured in this way if the participants desire. Keeping a player generally costs more than the price paid in the previous season, whether measured by how the team is assigned draft picks or by the cost of the player as part of the auction budget. In the past, players had to be manually assigned to their respective teams by the league commissioner before each season's draft, but commercial websites supporting such functionality are now available from Yahoo and other fantasy sports league website providers.

Much less commonly, fantasy sports leagues have incorporated the concept of multiyear contracts. Multiyear contract leagues allow/force team owners to commit to players for some number of seasons, with each season carrying a cost from the owner's annual allotment of draft picks or budget. The timing of decisions regarding contracts varies from league to league and, in some cases, player to player. When a player carries a contract for the next year, the player will not reenter the draft pool heading into the next season but will, instead, remain on the team that owns the player's contract, similar to a player kept in a keeper league but potentially for several concurrent seasons. Multiyear contract leagues are relatively rare but several formats for executing them exist.

One known commercial fantasy sports league website provider, Reality Sports Online (realitysportsonline.com) ("RSO"), offers a website that uses proprietary software-generated multiyear contract offers from which team owners may choose during an auction process. More particularly, the terms of the contracts are generated by its own software and bid on by the team owners. This happens only during the auction, before anyone owns the player in question. To "win" the player in the auction means having offered the contract having the highest value, according to the software. Because the terms of the winning bid for that contract are subject to the open market (i.e., the various team owners) via the auction draft, RSO has thus found a way to establish "fair" contracts for players.

Unfortunately, the terms of the RSO contracts are generated by the website functionality, rather than by the team owners. Neither the RSO platform nor any other platform has yet allowed managers to create their own contract offers, to gain approval of such offers, and after those offers are "accepted," to enforce those contracts automatically. Thus, a need exists for improvements in the area of multiyear contract gameplay in fantasy sports leagues.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

Broadly defined, the present invention according to one aspect relates to a computer implemented method for facilitating management of multiyear ownership rights in fantasy sports league gameplay as shown and described.

Broadly defined, the present invention according to another aspect relates to a computer implemented system for facilitating management of multiyear ownership rights in fantasy sports league gameplay as shown and described.

Broadly defined, the present invention according to another aspect relates to a computer implemented method including: displaying, to a first user via an electronic display associated with a first electronic device, a first interface of a fantasy sports league management website that includes a contract management user interface element for accessing a contract management interface, the first user being registered with the fantasy sports league management website as an owner of a first fantasy sports team belonging to a first fantasy sports league; receiving, from the first user via one or more input devices, first user input representing interaction with the contract management user interface element; displaying, to the first user via the electronic display associated with the first electronic device, a first contract management interface of the fantasy sports league management website that includes one or more user input elements configured to allow a user to select a player and specify a contract duration and contract amount for such selected player; receiving, from the first user via one or more input devices associated with the first electronic device, second user input representing proposal of a first contract via selection of a first player and specification of a first contract duration and a first contract amount for the selected first player, the first contract duration being a duration longer than one year; subsequently, for each of a plurality of other respective users who are registered with the fantasy sports league management website as an owner of a fantasy sports team belonging to the first fantasy sports league, (1) displaying, to the respective user via an electronic display associated with a respective electronic device, an interface of the fantasy sports league management web site that displays an indication of the first player, the first contract duration, and the first contract amount, and prompts the respective user to vote yes or no for the first contract for the first player at the first contract amount for the first contract duration, and (2) receiving, from the respective user via one or more input devices associated with the respective electronic device, respective user input representing a vote of yes or no for the first contract for the first player at the first contract amount for the first contract duration; electronically determining, at a server associated with the fantasy sports league management website, based on the respective user input representing a vote of yes or no received from each of the other respective users, that the first contract should become official; and thereafter, for a next season of the first fantasy sports league, automatically counting the first contract amount for the first contract against a total salary amount of the first fantasy team.

In a feature of this aspect, electronically determining that the first contract should become official includes determining that a number of yes votes exceeded a number of no votes.

In another feature of this aspect, electronically determining that the first contract should become official includes determining that a number of yes votes exceeded a number determined based on a number of teams in the first league.

In another feature of this aspect, electronically determining that the first contract should become official includes determining that a number of yes votes exceeded a number determined based on a number of voting users in the first league.

In another feature of this aspect, electronically determining that the first contract should become official includes determining that a percentage determined by dividing the number of yes votes by the total number of votes exceeded a predetermined threshold.

In another feature of this aspect, electronically determining that the first contract should become official includes determining that a percentage determined by dividing the number of yes votes by the total number of votes exceeded a league manager configured threshold.

In another feature of this aspect, electronically determining that the first contract should become official includes determining that a number of yes votes exceeded a predetermined threshold.

In another feature of this aspect, electronically determining that the first contract should become official includes determining that a number of yes votes exceeded a league manager configured threshold.

Broadly defined, the present invention according to another aspect relates to a computer implemented method including: displaying, to a first user via an electronic display associated with a first electronic device, a first interface of a fantasy sports league management app that includes a contract management user interface element for accessing a contract management interface, the first user being registered with the fantasy sports league management app as an owner of a first fantasy sports team belonging to a first fantasy sports league; receiving, from the first user via one or more input devices, first user input representing interaction with the contract management user interface element; displaying, to the first user via the electronic display associated with the first electronic device, a first contract management interface of the fantasy sports league management app that includes one or more user input elements configured to allow a user to select a player and specify a contract duration and contract amount for such selected player; receiving, from the first user via one or more input devices associated with the first electronic device, second user input representing proposal of a first contract via selection of a first player and specification of a first contract duration and a first contract amount for the selected first player, the first contract duration being a duration longer than one year; subsequently, for each of a plurality of other respective users who are registered with the fantasy sports league management app as an owner of a fantasy sports team belonging to the first fantasy sports league, (1) displaying, to the respective user via an electronic display associated with a respective electronic device, an interface of the fantasy sports league management app that displays an indication of the first player, the first contract duration, and the first contract amount, and prompts the respective user to vote yes or no for the first contract for the first player at the first contract amount for the first contract duration, and (2) receiving, from the respective user via one or more input devices associated with the respective electronic device, respective user input representing a vote of yes or no for the first contract for the first player at the first contract amount for the first contract duration; electronically determining, at a server associated with the fantasy sports league management app, based on the respective user input representing a vote of yes or no received from each of the other respective users, that the first contract should become official; and thereafter, for a next season of the first fantasy sports league, automatically counting the first contract amount for the first contract against a total salary amount of the first fantasy team.

Broadly defined, the present invention according to another aspect relates to a computer implemented method including: maintaining, at one or more servers, software code for a fantasy sports league management website; providing to a first device, by the one or more servers in response to access by a first user of the fantasy sports league management web site via a web browser running at the first device, code for generating a first contract management interface of the fantasy sports league management website that includes one or more user input elements configured to allow a user to select a player and specify a contract duration and contract amount for such selected player; receiving, at the one or more servers from the first device, data representing proposal by the first user of a first contract for a first player for a first contract duration at a first contract amount, the first contract duration being a duration longer than one year; subsequently, for each of a plurality of other respective users who are registered with the fantasy sports league management website as an owner of a fantasy sports team belonging to the first fantasy sports league, (1) providing to a respective device, by the one or more servers in response to access by the respective user of the fantasy sports league management web site via a web browser running at the respective device, code for generating an interface of the fantasy sports league management website that displays an indication of the first player, the first contract duration, and the first contract amount, and prompts the respective user to vote yes or no for the first contract for the first player at the first contract amount for the first contract duration, and (2) receiving, at the one or more servers from the respective device, data representing a vote of yes or no for the first contract for the first player at the first contract amount for the first contract duration; electronically determining, at the one or more servers associated with the fantasy sports league management web site, based on the received data representing a vote of yes or no received from each of the other respective users, that the first contract should become official; and thereafter, for a next season of the first fantasy sports league, automatically counting the first contract amount for the first contract against a total salary amount of the first fantasy team.

Broadly defined, the present invention according to another aspect relates to a computer implemented method including: maintaining, at one or more servers, software code for a fantasy sports league management platform; providing to a first device, by the one or more servers in response to access by a first user of the fantasy sports league management platform, data for a first contract management interface of the fantasy sports league management platform that includes one or more user input elements configured to allow a user to select a player and specify a contract duration and contract amount for such selected player; receiving, at the one or more servers from the first device, data representing proposal by the first user of a first contract for a first player for a first contract duration at a first contract amount, the first contract duration being a duration longer than one year; subsequently, for each of a plurality of other respective users who are registered with the fantasy sports league management platform as an owner of a fantasy sports team belonging to the first fantasy sports league, (1) providing to a respective device, by the one or more servers in response to access by the respective user of the fantasy sports league management platform via a web browser running at the respective device, data for an interface of the fantasy sports league management platform that displays an indication of the first player, the first contract duration, and the first contract amount, and prompts the respective user to vote yes or no for the first contract for the first player at the first contract amount for the first contract duration, and (2) receiving, at the one or more servers from the respective device, data representing a vote of yes or no for the first contract for the first player at the first contract amount for the first contract duration; electronically determining, at the one or more servers associated with the fantasy sports league management platform, based on the received data representing a vote of yes or no received from each of the other respective users, that the first contract should become official; and thereafter, for a next season of the first fantasy sports league, automatically counting the first contract amount for the first contract against a total salary amount of the first fantasy team.

Broadly defined, the present invention according to another aspect relates to a computer implemented method including: displaying, to a first user via an electronic display associated with a first electronic device, a first interface of a fantasy sports league management website that includes a contract management user interface element for accessing a contract management interface, the first user being registered with the fantasy sports league management website as an owner of a first fantasy sports team belonging to a first fantasy sports league; receiving, from the first user via one or more input devices, first user input representing interaction with the contract management user interface element; displaying, to the first user via the electronic display associated with the first electronic device, a first contract management interface of the fantasy sports league management website that includes one or more user input elements configured to allow a user to select a player and specify a contract duration and contract amount for such selected player; receiving, from the first user via one or more input devices associated with the first electronic device, second user input representing proposal of a first contract via selection of a first player and specification of a first contract duration and a first contract amount for the selected first player, the first contract duration being a duration longer than one year; subsequently, for each of a plurality of other respective users who are registered with the fantasy sports league management website as an owner of a fantasy sports team belonging to the first fantasy sports league, displaying, to the respective user via an electronic display associated with a respective electronic device, an interface of the fantasy sports league management website that displays an indication of the first player, the first contract duration, and the first contract amount, and prompts the respective user to vote yes or no for the first contract for the first player at the first contract amount for the first contract duration, and receiving, from the respective user via one or more input devices associated with the respective electronic device, respective user input representing a vote of yes or no for the first contract for the first player at the first contract amount for the first contract duration; and electronically determining, at a server associated with the fantasy sports league management website, based on the respective user input representing a vote of yes or no received from each of the other respective users, that the first contract should not become official.

In a feature of this aspect, electronically determining that the first contract should not become official comprises determining that a number of yes votes did not exceed a number of no votes.

In another feature of this aspect, electronically determining that the first contract should not become official comprises determining that a number of yes votes did not exceed a number determined based on a number of teams in the first league.

In another feature of this aspect, electronically determining that the first contract should not become official comprises determining that a number of yes votes did not exceed a number determined based on a number of voting users in the first league.

In another feature of this aspect, electronically determining that the first contract should not become official comprises determining that a percentage determined by dividing the number of yes votes by the total number of votes did not exceed a predetermined threshold.

In another feature of this aspect, electronically determining that the first contract should not become official comprises determining that a percentage determined by dividing the number of yes votes by the total number of votes did not exceed a league manager configured threshold.

In another feature of this aspect, electronically determining that the first contract should not become official comprises determining that a number of yes votes did not exceed a predetermined threshold.

In another feature of this aspect, electronically determining that the first contract should not become official comprises determining that a number of yes votes did not exceed a league manager configured threshold.

Broadly defined, the present invention according to another aspect relates to a graphical user interface method involving a structured graphical user interface enabling unconventional functionality that provides a technical solution to the problem of how to allow users of a fantasy sports league management platform to utilize multiyear contracts.

Further areas of applicability of the present invention will become apparent from the detailed description provided hereinafter. It should be understood that the detailed description and specific examples, while indicating preferred embodiment(s) of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein:

FIG. 2 is a screenshot of an exemplary main roster webpage of the fantasy sports league management web site of FIG. 1;

FIG. 4 is a screenshot of the exemplary contract management webpage of FIG. 3, shown with a particular player selected;

FIGS. 5 and 6 are screenshots of an exemplary contract proposal screen on a webpage of the fantasy sports league management website of FIG. 1;

FIG. 7 is a screenshot of the exemplary contract management webpage of FIG. 3 after the proposed contract has been submitted;

FIG. 8, which is a screenshot of the exemplary contract management webpage of FIG. 3, shown with the newly-accepted contract for the player made official;

FIG. 11 is a screenshot of an exemplary player drop webpage of the fantasy sports league management web site of FIG. 1;

FIG. 12 is a screenshot of the exemplary contract management webpage of FIG. 3 after a player has been dropped;

FIGS. 13A and 13B are screenshots of the exemplary contract management webpage of FIG. 3 showing two team rosters, respectively, after a trade has been completed between the two teams;

FIG. 14 is a screenshot of an exemplary league contract summary webpage of the fantasy sports league management website of FIG. 1;

DETAILED DESCRIPTION

Figure 1:
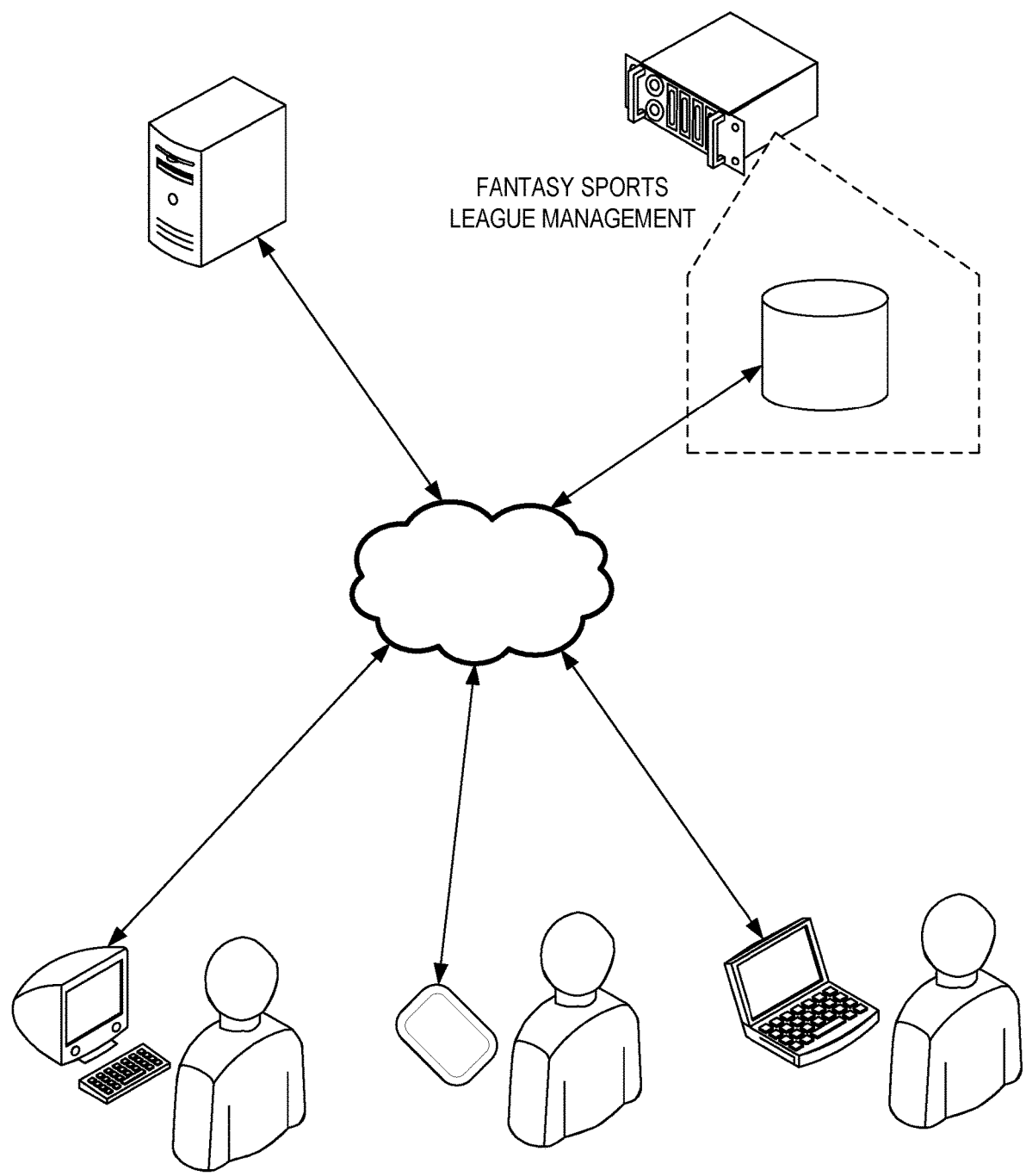
FIG. 1 generally illustrates an exemplary architecture for a methodology where users utilizing electronic devices access, over the internet, a fantasy sports league management web site, hosted at a remote server, in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Furthermore, an embodiment of the invention may incorporate only one or a plurality of the aspects of the invention disclosed herein; only one or a plurality of the features disclosed herein; or combination thereof. Moreover, many embodiments, including adaptations, variations, modifications, and equivalent arrangements, are implicitly disclosed herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention in any claim of a patent issuing here from, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Further, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

FIG. 1 generally illustrates an exemplary architecture for a methodology where users utilizing electronic devices access, over the internet, a fantasy sports league management web site, hosted at a remote server, in accordance with one or more preferred embodiments of the present invention. The architecture is preferably scalable such that large numbers of users organized into a large number of separate leagues may access the relevant data for their league. The relevant data includes both data specific to their league as well as general data (commonly, although not necessarily exclusively, related to the actual sport on which the league is based) that is available to all of the users in some or all of the leagues. The website provides functionality related to one or more of the functions of selecting, adding, dropping, and trading players, displaying team and individual statistics, displaying fantasy team scoring, displaying fantasy league standings, and/or other conventional fantasy sports league management website functions.

Figure 2:
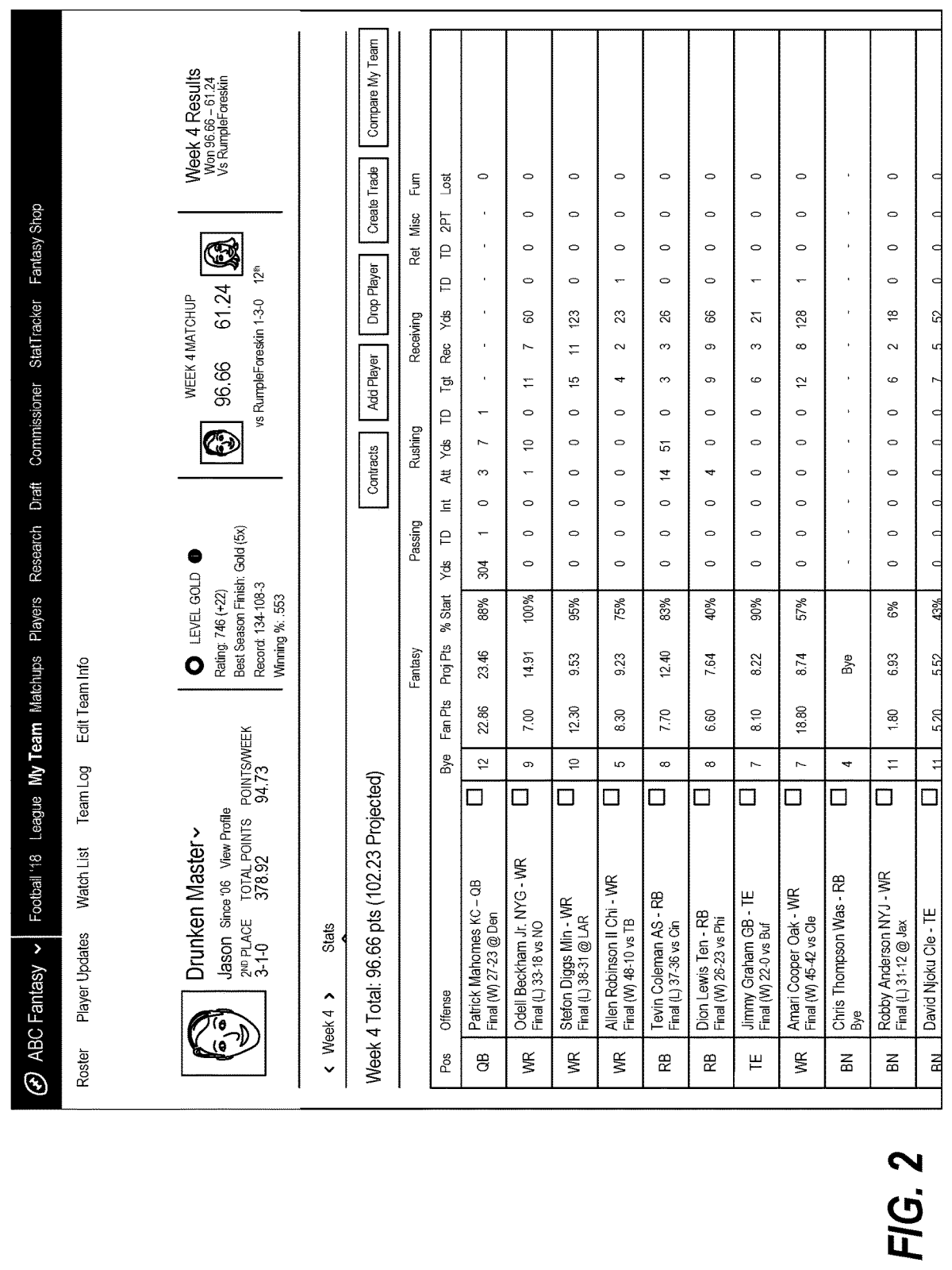

FIG. 2 is a screenshot of an exemplary main roster webpage of the fantasy sports league management website of FIG. 1. Webpages generally similar or related in function to this webpage are commonly used in fantasy sports websites to provide roster management functionality for team owners. Such webpages primarily display the roster for the owner's team, and may further include indications of position, active versus reserve status, injury and/or other player status, relevant statistics (weekly, cumulative, and/or the like), fantasy league points, player rankings, and other relevant information. Statistics, points, rankings, and the like may be based on actual data or projected data. If the website is offered to multiple leagues (as most commercial websites do), then data compiled from other fantasy leagues may also be displayed, such as the percentage of leagues in which the particular player is "owned." In the exemplary webpage of FIG. 2, each player's relevant statistics after a previous week's game are displayed as well as his fantasy projection and actual production, but it will be apparent that the specific content and display format may vary considerably without departing from the scope of the present invention.

Notably, the webpage of FIG. 2 differs from similar conventional webpages in the inclusion of means for accessing a contract management page. In conventional web sites, there is no place for display or functionality concerning multiyear contracts on this or any other page throughout the site or any coordinating site or application. In the exemplary webpage of FIG. 2, such functionality may be accessed by pointing a mouse or otherwise selecting the "Contracts" button shown therein.

Figure 3:
FIG. 3 is a screenshot of an exemplary contract management webpage of the fantasy sports league management website of FIG. 1.

FIG. 3 is a screenshot of an exemplary contract management webpage of the fantasy sports league management web site of FIG. 1. The contract management webpage preferably displays a roster of all players for which the team owner has a contractual obligation as well as an indication of the years, seasons, or the like over which the obligation extends. In at least some embodiments, the contract management webpage includes both players that are currently "under contract" as well as players that have been released from the team but for which the owner still has some sort of obligation. As used herein, the term "under contract" refers to an ownership right held by a particular team owner for a particular player for a designated period of time, all as established by the rules of a particular fantasy sports league. Notably, the functionality of the present invention accommodates periods of time that may be one season, multiple seasons, or other time periods, all according the rules of the particular fantasy sports league making use of such functionality. With respect to the roster shown in FIG. 3, the team "Drunken Master" has Patrick Mahomes and Odell Beckham, Jr., among others, under contract for multiple future seasons in addition to the current season (2018).

As described herein, the present invention incorporates functionality that allows the automatic implementation and enforcement of these contracts. For example, when drafts for future seasons occur in this league, then so long as the selection process is carried out via a web site that utilizes the functionality of the present invention and holds a record of the existing contracts, Mahomes, Beckham, and other players under multiyear contracts will be automatically withheld from the pool of available players, such players will be retained by Drunken Master, and Drunken Master's draft picks, available auction money, or the like will be affected accordingly.

The mechanism for proposing, approving, implementing, and/or enforcing multiyear contracts for players on fantasy sports teams may be illustrated with reference to FIG. 3 and subsequent illustrations. It will be appreciated that in the roster for Drunken Master shown in FIG. 3, Dion Lewis is on the current roster (for the 2018 season), but is not currently under contract for future years. To propose an extended contract offer for Dion Lewis (roughly akin to offering a contract to a free agent in a professional sports league), the team owner for Drunken Master may first select Dion Lewis by clicking a corresponding icon (e.g., the handshake icon on the right of the highlighted area) or by other means. In this regard, FIG. 4 is a screenshot of the exemplary contract management webpage of FIG. 3, shown with Dion Lewis selected. An "Add Contract" button or other user interface element may additionally or alternatively be provided for this or related functionality.

Figure 5:
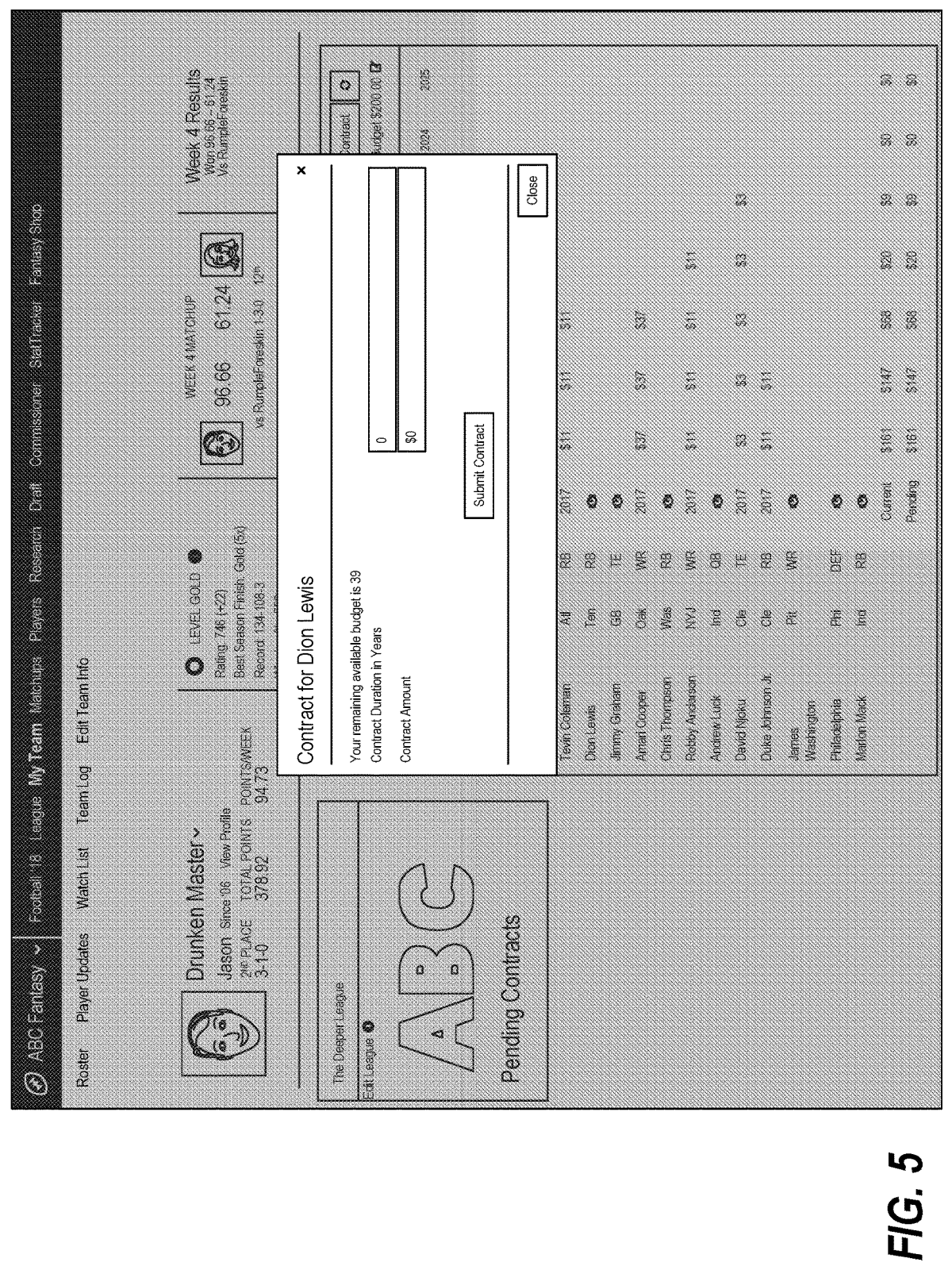
Figure 6:
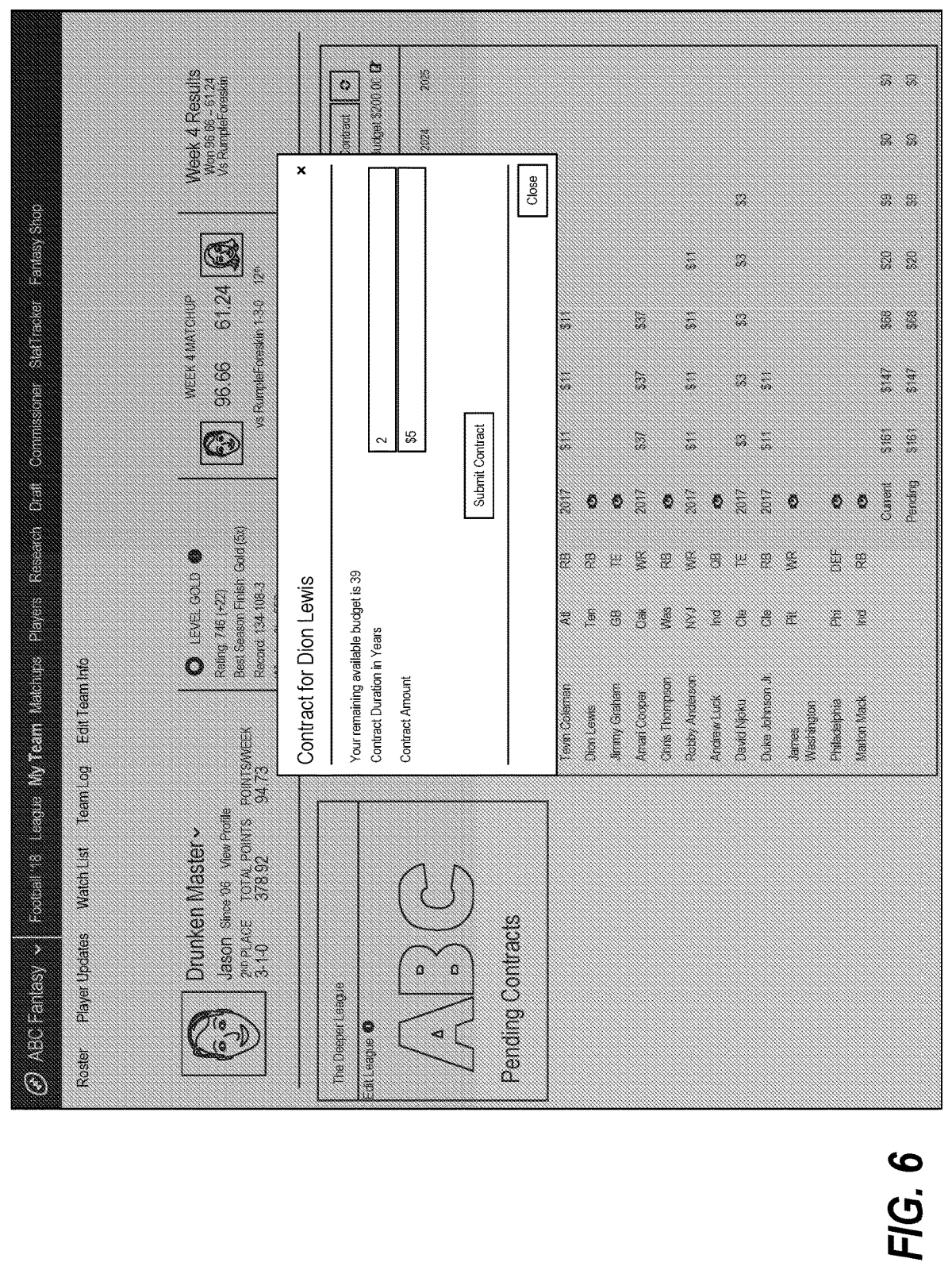

In response, a new webpage, a popup, or other display element is preferably displayed to the user. In this regard, FIG. 5 is a screenshot of an exemplary contract proposal screen on a webpage of the fantasy sports league management web site of FIG. 1. Using such a contract proposal screen, the team owner for Drunken Master may propose a contract for Dion Lewis that spans any number of future seasons and costing any number of future annual drafting assets—in this case, money from an auction budget. For example, as shown in FIG. 6, the Drunken Master team owner may offer to pay Lewis $5 for each of the next two seasons. After entering the information, the Drunken Master team owner may point-and-click a mouse or otherwise select "Submit Contract" to submit the data for the proposed contract to the web site.

Figure 7:
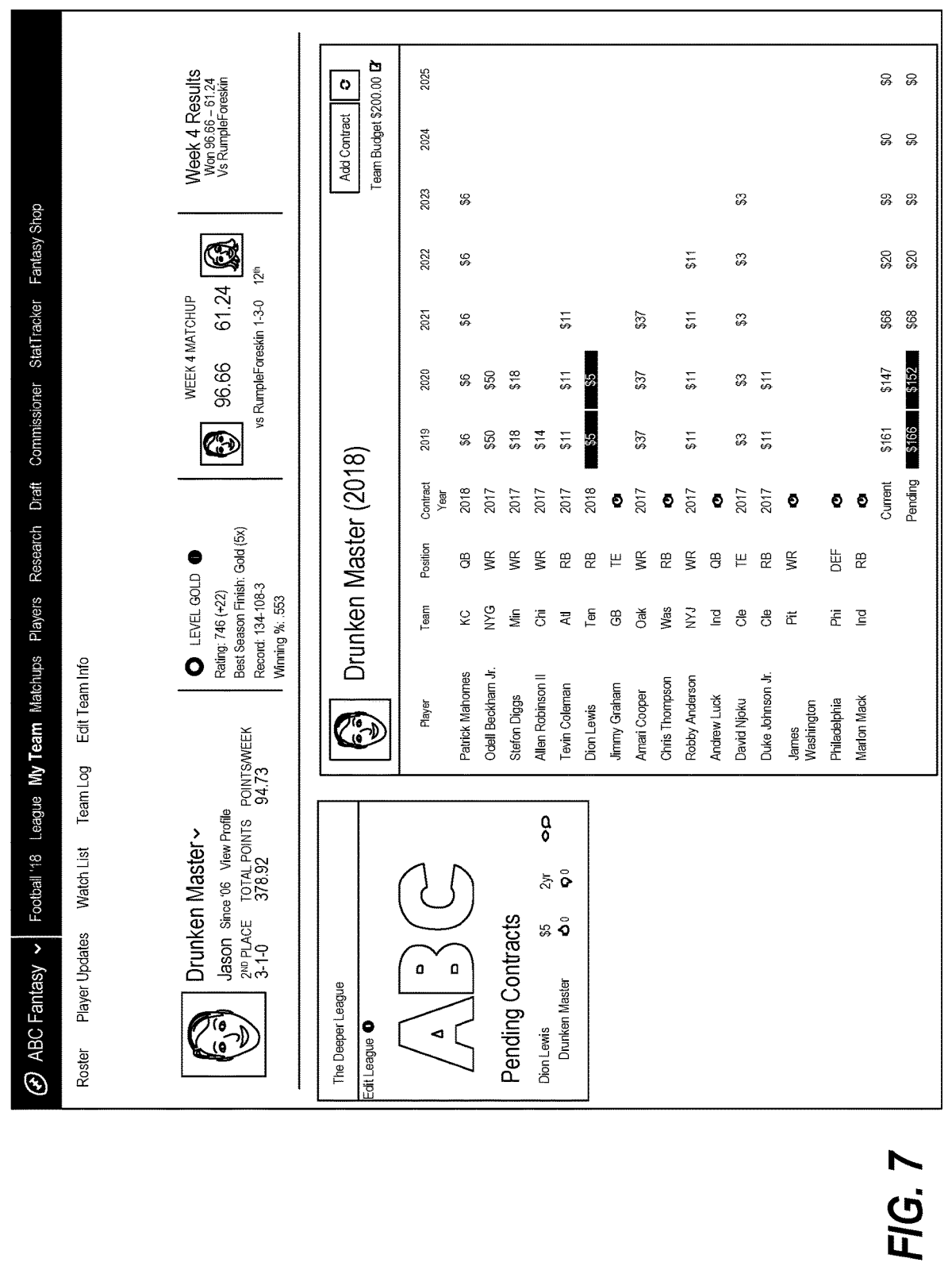

In at least some embodiments, the contract management webpage is then displayed again, but preferably with an indication that a contract has been proposed, but has not yet been approved, accepted, or the like. In this regard, FIG. 7 is a screenshot of the exemplary contract management webpage of FIG. 3 after the proposed contract has been submitted. As shown therein, the details of the proposed contract have been added to the listing of contract years for Dion Lewis; however, because the proposed contract has not yet been approved, an indication (such as use of a different color, use of a special icon, or the like) of this pending status is preferably provided in conjunction with the listing for that player. However, in at least some embodiments, the details of the proposed contract are not added to the listing of contract years for the player, or the user has the option of choosing whether to display both pending and existing contracts, to display only existing contracts, or even to display only pending contracts.

Regardless of whether the proposed contract details are added to the roster listing as described above, the proposed contract for Dion Lewis is preferably added to a current list of pending contracts. In the exemplary webpage of FIG. 7, the list of pending contracts is titled "Pending Contracts" and is displayed along the left side of the screen. In at least some embodiments, the complete list is displayed to every team owner in the league, but in various permutations, the pending contracts may be segregated by team owner, the contracts proposed by a team owner may be highlighted when that team owner reviews the list, and/or other display techniques may be used to facilitate ease of use. Furthermore, although the pending contracts list is shown on the same webpage as the roster for a particular team owner, the list of pending contracts may instead be provided on a separate webpage, in a popup, and/or the like.

Once the proposed contract has been submitted, it becomes subject to a vote by all other managers in the league. Every team owner in the league gains the ability to see the pending offer, such as via the exemplary webpage of FIG. 7. Notably, every team owner gains the ability to vote on the pending offer, with the outcome of the vote controlling whether the proposed contract becomes official or not. (It will be appreciated that fantasy sports leagues often provide the capability for ownership of a team to be shared by more than one individual, with each individual having the ability to act as a user of the web site. It is expected that voting on contract offers would occur on a "one team, one vote" principle, but accommodation may optionally be made for every individual user to have a separate vote if desired.) In the exemplary webpage of FIG. 7, a user may vote to approve the proposed contract by clicking the "thumbs up" icon, or to reject the proposed contract by clicking the "thumbs down" icon.

Figure 8:
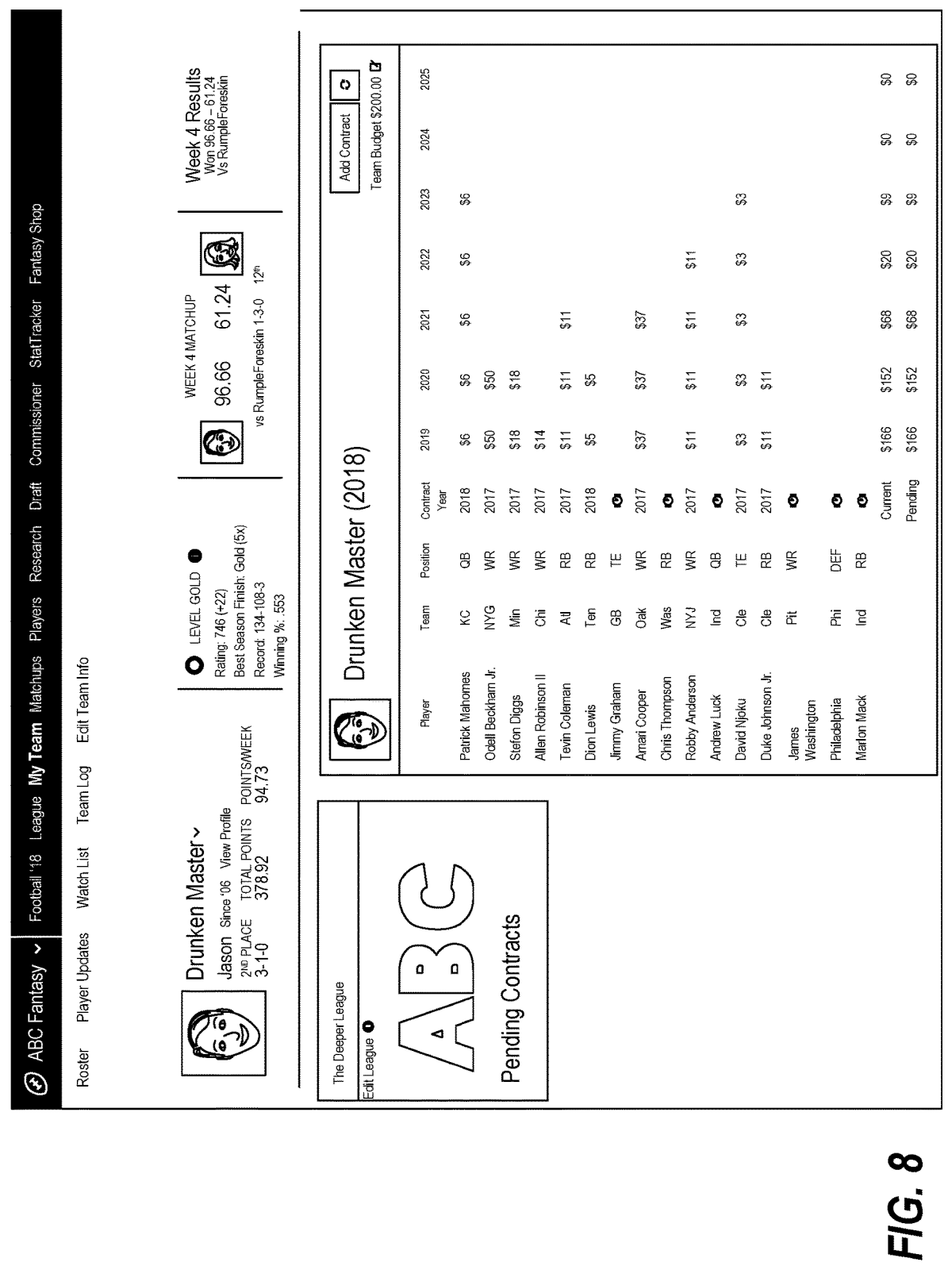

The vote is tallied with the other owner votes, and the proposed contract is ultimately approved or rejected accordingly. In at least some embodiments, the requisite number of votes to approve the proposed contract and/or the requisite number to reject the proposed contract are established by consensus of the league owners, but a default may be provided by the website provider. If the proposed contract is rejected, the exemplary contract management webpage of FIG. 3 would once again be displayed in relation to the team for Drunken Master. On the other hand, if the proposed contract is approved (by vote), then the newly-approved contract would be reflected as shown in FIG. 8, which is a screenshot of the exemplary contract management webpage of FIG. 3, shown with the newly-accepted contract for Dion Lewis made official.

The process described and illustrated thus far applies most particularly to the proposal and approval or rejection of contracts (fantasy sports team player ownership) for players who are already on a team owner's roster for at least the current season. As described below, however, a corresponding process may be utilized to propose contracts for players who are "free agents" in the relevant fantasy sports league. As used herein, the term "free agent" refers to any player that is not currently assigned to a team but is available to be added to a team according to the league's rules. Conventionally, fantasy sports websites provide an interface that includes a listing of all players that are free agents, and/or provides a listing of players that include both players that are free agents and players that are not free agents together with an indication as to each player's status with respect to free agency, and/or provides the ability to select a particular player and provides an indication, for that player, as to whether the player is or is not a free agent, and/or provides other means for providing information about the free agency status of one or more player. In some or all of these interfaces, a selectable button or other graphical user interface means is provided such that a user (team owner) may select a player who is a free agent for addition to the team owner's team, or may submit a request for the player to be added to the team according to the league's rules.

In at least some embodiments of the present invention, contracts may be proposed, reviewed, voted on, and approved or rejected for free agents. For example, the website may alternatively or additionally provide access, in response to the selection of a free agent (or in response to the submission of a request for a free agent) by a user, to a tool similar to the one described above for proposing the terms of a contract for that player, with the proposed terms to be voted on by the ownership in the league. In some such embodiments, free agents may only be added to a team if the owner proposes a contract that is accepted by the ownership, even if the contract only covers the current year. In other embodiments, only contracts extending beyond the current year are subject to the voting process.

Figure 9:
FIG. 9 is a screenshot of an exemplary voting details webpage of the fantasy sports league management web site of FIG. 1.
Figure 10:
FIG. 10 is a screenshot of an exemplary owner voting details webpage of the fantasy sports league management website of FIG. 1.

In at least some embodiments, additional information is/may be made available to team owners for each multiyear contract that has been proposed. In this regard, FIG. 9 is a screenshot of an exemplary voting details webpage of the fantasy sports league management website of FIG. 1. Such a webpage is preferably made accessible from some or all other webpages that pertain directly to contracts, rosters, or the like. With reference to FIG. 9, such a webpage may include a listing or other display of the details of one or more contract proposals, wherein such details may include some or all, without limitation, of the following: parameters of the offer (years, amount/draft pick cost, etc), the date of the offer, the team making the offer, the status of the offer (pending, approved, denied, etc), the date of approval or denial of the offer, the number of votes cast (including total, subtotals, etc), a voting record (listing details for each individual offer, including voter, date of vote, and indication of actual vote for or against), and/or other relevant information. (It will be appreciated that not all of these details are shown in FIG. 10.) In the screenshot, details are shown regarding a contract proposal made by team "Drunken Master" on Aug. 26, 2018 for player "Dion Lewis" for two years at $5 per year, as well as details regarding a contract proposal made by team "Beer Run" on Aug. 26, 2018 for player "Kenyon Johnson" for four years at $10 per year.

In at least some embodiments, additional information is/may be made available to team owners regarding the voting records for the various team owners. In this regard, FIG. 10 is a screenshot of an exemplary owner voting details webpage of the fantasy sports league management web site of FIG. 1. Such a webpage is preferably made accessible from some or all other webpages that pertain directly to contracts, voting, owner details, or the like. With reference to FIG. 10, such a webpage may include a listing or other display of voting details for one or more of the owners in the league, wherein such details may include without limitation each user name and/or owner name, their team name, the number of proposed contracts they have voted on, the number of contracts they have proposed, the total number of "yes" votes, the number of "no" votes, the total number of contracts proposed for which they have not or did not vote, the number of pending contracts upon which they have not voted, the percentage of all proposed contracts for which each user has voted "yes," the percentage of all proposed contracts upon which they have voted, and the like. (It will be appreciated that not all of these details are shown in FIG. 10.) In the screenshot, it may be seen that user "Brandon," whose team name is "Beer Run," has proposed 6 contracts, voted on 12 contracts, of which 7 of the votes were "yes" votes and 5 were "no" votes.

It is recognized that in order for voting by fellow team owners to be used to control the acceptability of multiyear player ownership arrangements in a given fantasy sports league, it is important to ensure that the owners participate in the voting process. Thus, in at least some embodiments, voting requirements, preferably enforced automatically via the website (with potential override by a designated league commissioner), may be utilized to provide motivation for owners to participate in the voting process. The website provider may permit each league to structure its own rules or may require all leagues to utilize the same rules. In one approach, a rule is enforced wherein once a predetermined number of contract offers have been made in the league in the then-current season, each manager must keep his/her percentage of offers "voted on" above a predetermined threshold in order to retain the ability to offer contracts himself or herself. The league's commissioner may determine, for example, that all managers must maintain a 50% voting turnout after the season's first 20 contract offers or else lose the ability to offer contracts. The specifics can be set to the league's preferences but the invention will enforce them automatically by disabling the offer feature when appropriate and displaying a message of explanation.

Figure 11:
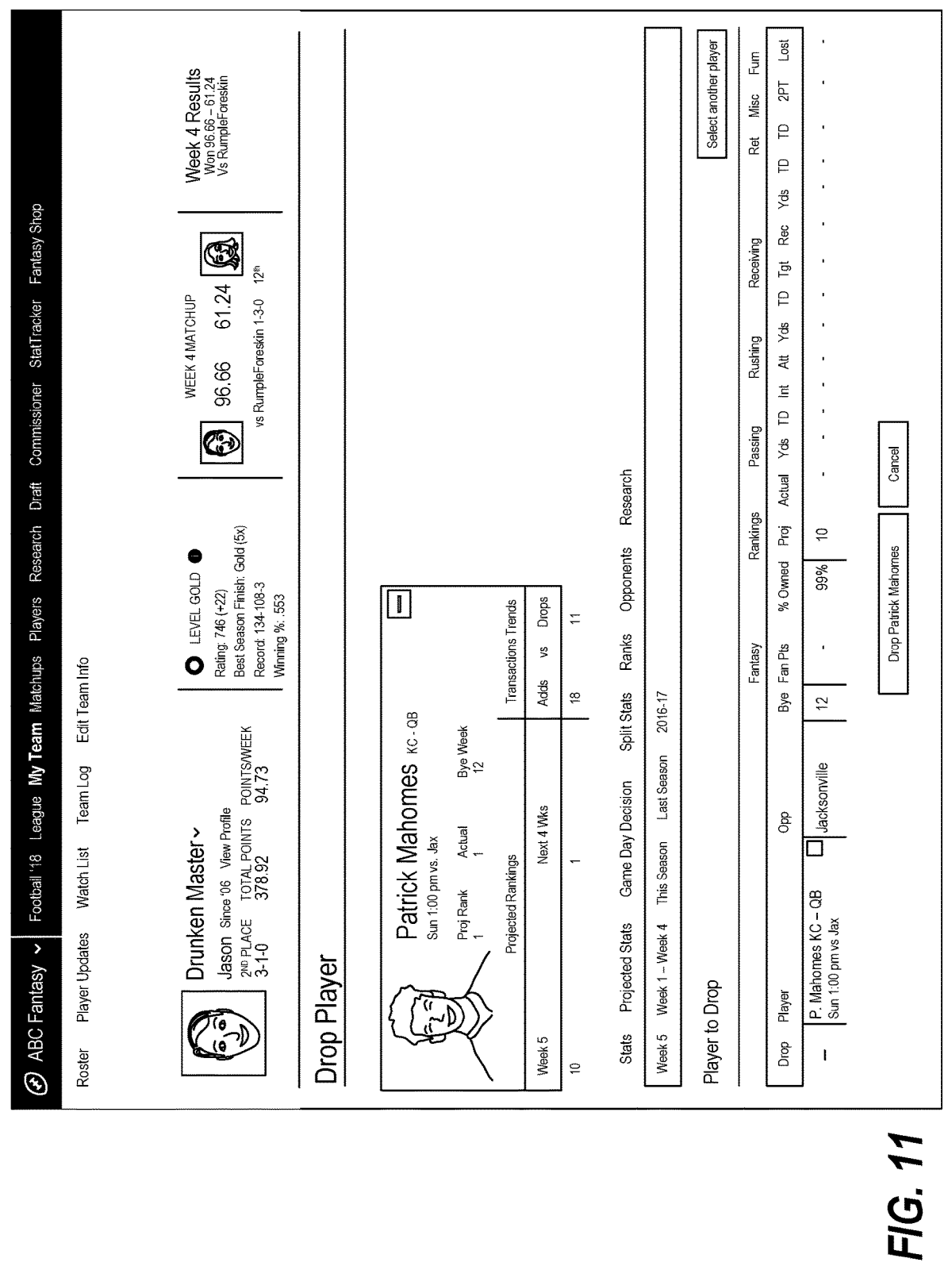

In at least some embodiments, an additional feature for enhanced fantasy sports gameplay is provided regarding obligations for future years of a multiyear contract when a player under a multiyear contract is dropped from his owner's team. By way of background, it will be appreciated that in traditional fantasy sports leagues, when a team owner drops a player from his or her team, the relationship between the player and the team or team owner is over. However, in a fantasy sports league with multiyear contracts, league rules may require that a team owner maintain some obligation for future years of a contract with a player even if the player is dropped from the owner's team. In this regard, FIG. 11 is a screenshot of an exemplary player drop webpage of the fantasy sports league management website of FIG. 1. As with conventional fantasy sports league management websites, such a webpage facilitates removal of a player from a fantasy team's roster. For example, in the screenshot of FIG. 11, the player "Patrick Mahomes" has been selected for dropping from the team whose roster is shown in FIG. 8. Once the user confirms that Patrick Mahomes is to be dropped, he will be officially removed from the team's roster.

However, as shown in the pre-drop roster of FIG. 8, the team owner had a multiyear obligation with regard to Patrick Mahomes. More particularly, the owner was expected to pay $6 (out of his official budget for this fantasy league) in each of five future years (2019-2023). Thus, although when dropped the player falls into free agency (or waivers), as in a conventional fantasy sports league, there may still be some effect, automatically enforced by the fantasy sports website, on the team owner's budget, draft picks, or the like for one or more of the future years of the original contract. For example, in a league where players are acquired at a cost (such as an auction-type league), the owner may still be required to pay all or some of the amount of the player's salary in the subsequent years of the multiyear contract. For each year, the amount may be a percentage of the salary, a capped amount (such as the first $5 of a player's salary), a flat amount (such as $1), or an amount calculated in some other way. In leagues where players are simply selected through draft, an owner may pay a penalty relative to his or her future draft picks.

Figure 12:
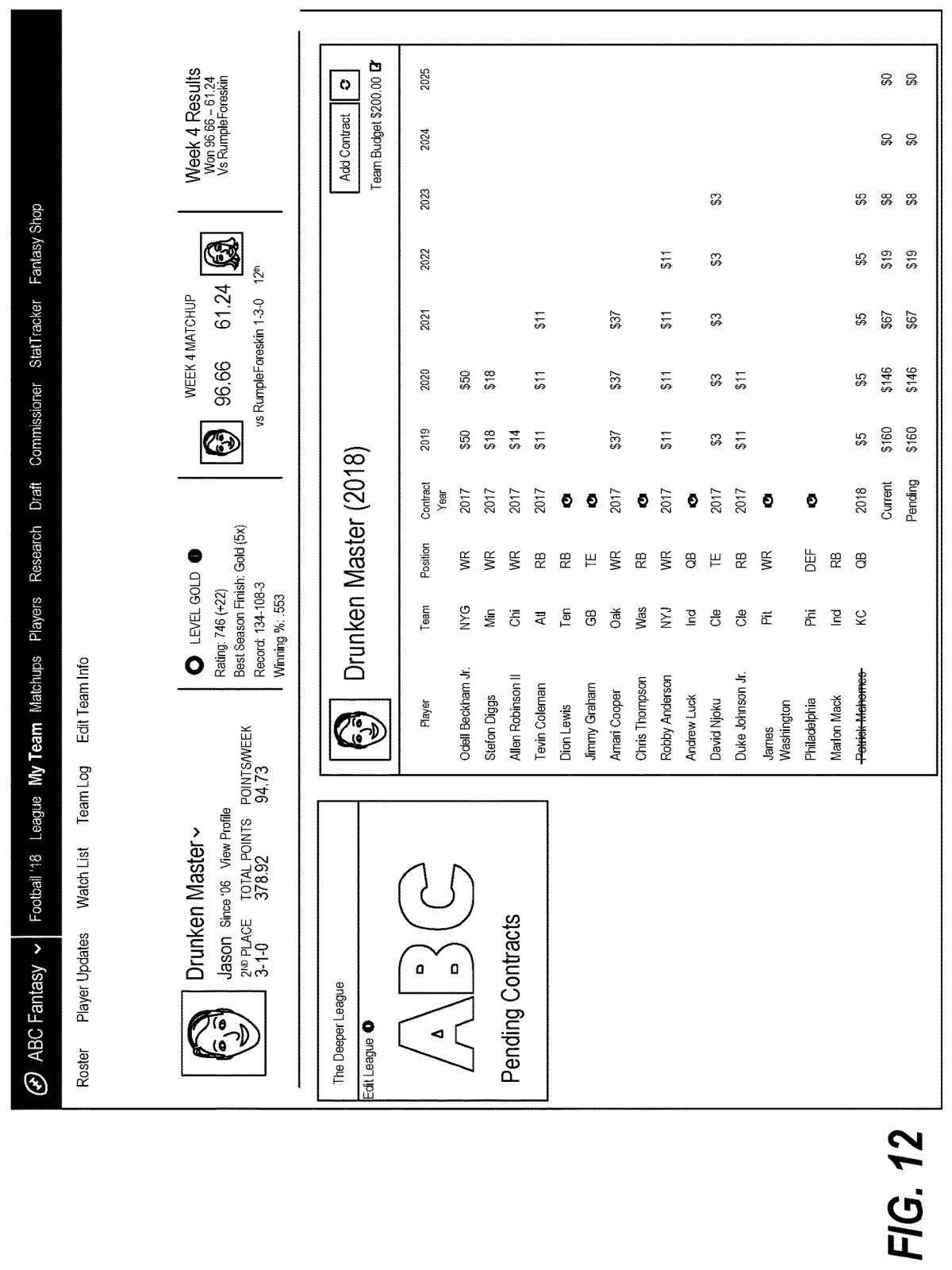

In this regard, FIG. 12 is a screenshot of the exemplary contract management webpage of FIG. 3 after Patrick Mahomes has been dropped. In this particular league, the first $5 of the dropped player's contract in each future year is allocated against the team owner's budget that year. More particularly, the team owner's budget obligations for each of 2019-2023 include $5 for Patrick Mahomes, even though Patrick Mahomes is no longer on the owner's roster. These amounts will be automatically withdrawn from the team's budget at the start of each draft until they are satisfied, just as with multiyear contracts for players still on the roster, with no manual manipulation of the data. The only user action required is the dropping of the player. Such an approach roughly mimics the use of "guaranteed contracts" in professional sports, where a player may be under contract to a team for some amount, but only a portion of that amount is "guaranteed," and if the team waives its rights to the player (typically because the performance provided by the player is no longer worth the cost of the player, but sometimes for other reasons), the team is only obliged to pay the player a portion of the amount. By including provision for a parallel mechanism in fantasy sports league play, a greater amount of gameplay realism is provided to the team owners.

In at least some embodiments, the website provides functionality for managing the transfer of multiyear contracts for players that are traded from one fantasy team to another. More particularly, when a team owner trades a player under multiyear contract to another team owner, the new team owner assumes the multiyear contract obligation, and the future obligations regarding the player are automatically disassociated from the former team owner and are automatically associated with the new team owner and his or her team. For example, FIGS. 13A and 13B are screenshots of the exemplary contract management webpage of FIG. 3 showing the Drunken Master team roster and the Beer Run team roster, respectively, after David Njoku has been traded from the Drunken Master team to the Beer Run team in exchange for Baker Mayfield. Notably, the David Njoku contract obligations shown for Drunken Master in FIG. 3 have been removed from Drunken Master and assigned to Beer Run, and Baker Mayfield contract obligations (which were previously assigned to Beer Run) have been assigned to Drunken Master.

In at least some embodiments, a comparison of the current and future contract obligations for all of the owners in the league is accessible to each user. In this regard, FIG. 14 is a screenshot of an exemplary league contract summary webpage of the fantasy sports league management web site of FIG. 1. Such a webpage is preferably made accessible from some or all other webpages that pertain directly to contracts, rosters, or the like. With reference to FIG. 14, such a webpage may include a listing of all team owners by name and by team name together with the total number of dollars committed in each future year. For example, in the screenshot of FIG. 14, the team owner or manager "Jason," whose team name is "Drunken Master," can be seen to have $161 already committed to player contracts for 2019, $147 for 2020, $68 for 2021, $20 for 2022, and $9 for 2023, while the team owner or manager "Brandon," whose team name is "Beer Run," can be seen to have $143 already committed to player contracts in both 2019 and 2020, $122 in both 2021 and 2022, and $48 in 2023. One or more links may be provided in such a website to enable access to contract details for an individual owner. For example, a clickable button may be provided for each owner wherein clicking or otherwise selecting such button takes a user to the exemplary contract management webpage of FIG. 3 with contract information for the selected owner being displayed therein.

Figure 15A:
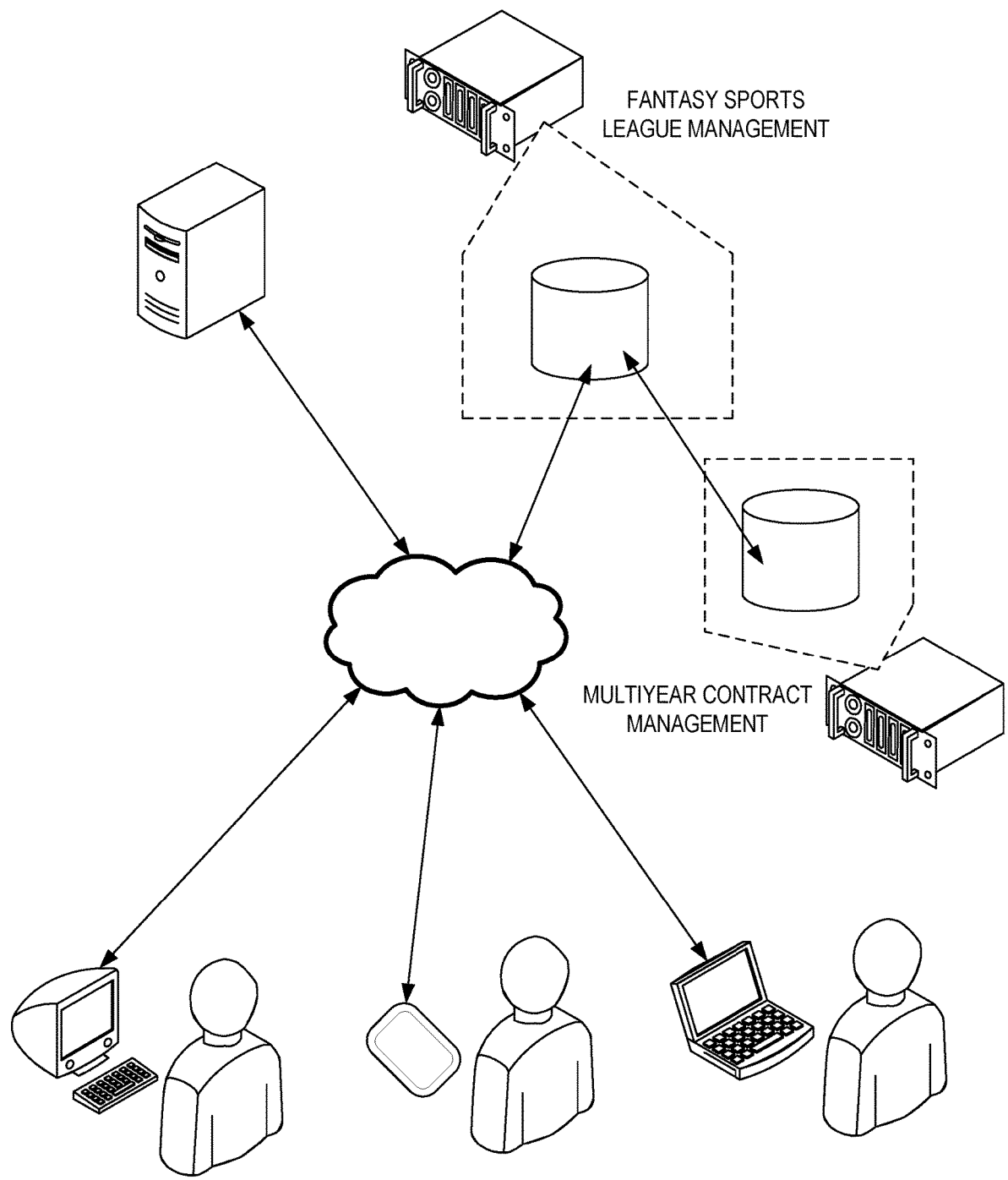
FIG. 15A generally illustrates an exemplary architecture for a methodology where users utilizing electronic devices access, over the internet, a fantasy sports league management web site, hosted at a remote server, that itself interacts with a separate multiyear contract management web site, hosted at a separate remote server, all in accordance with one or more alternative preferred embodiments of the present invention.
Figure 15B:
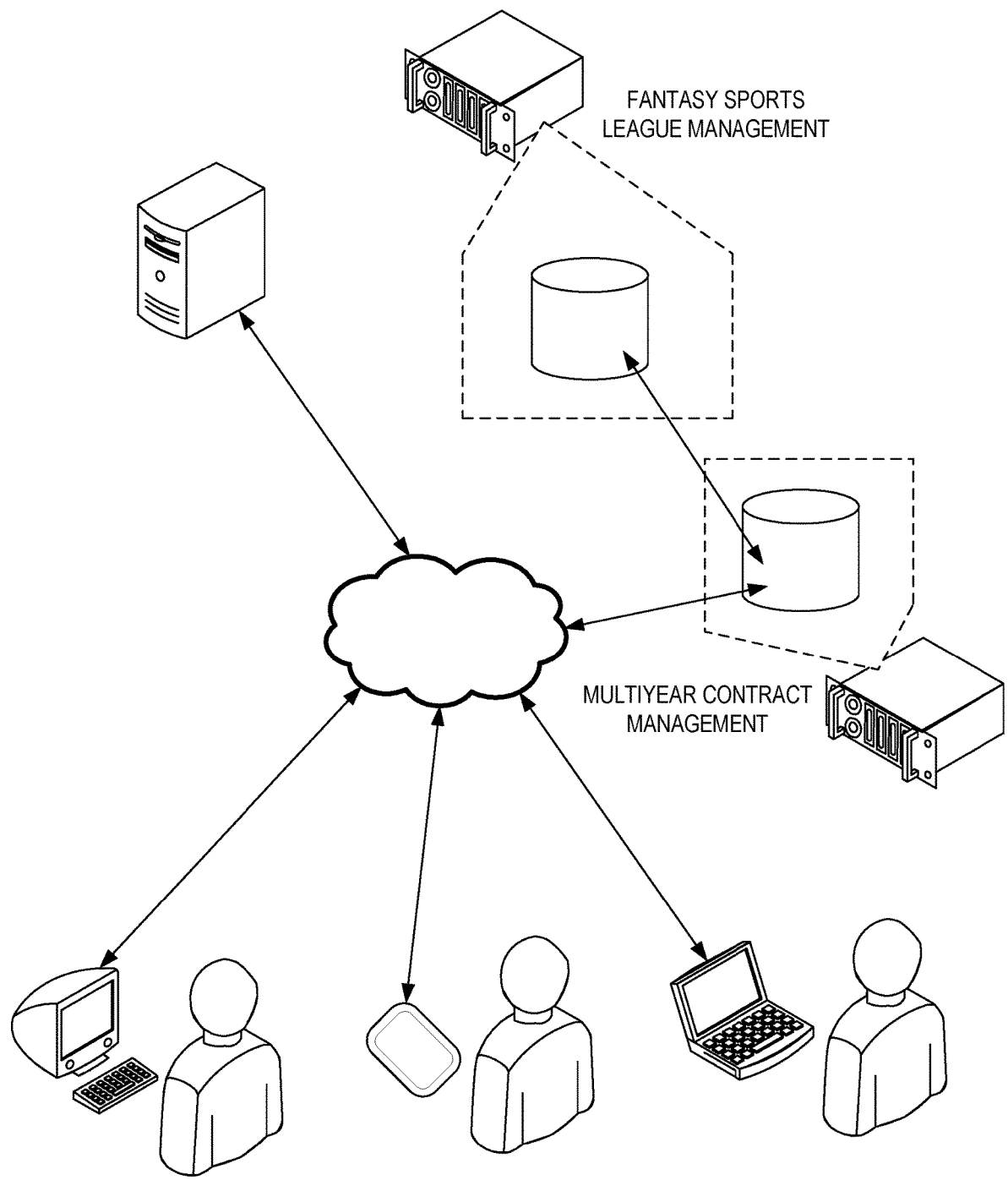
FIG. 15B generally illustrates an exemplary architecture for a methodology where users utilizing electronic devices access, over the internet, a multiyear contract management website, hosted at a remote server, that itself interacts with a separate fantasy sports league management website, hosted at a separate remote server, all in accordance with one or more alternative preferred embodiments of the present invention

The above webpages and functionality are described with respect to an integrated website system wherein the multiyear contract functionality is all included within the website of FIG. 2. It will be appreciated, however, that additionally or alternatively, such functionality may be provided via an architecture wherein multiyear contract functionality is provided by one website and conventional fantasy sports league functionality is provided by a different website. FIG. 15A generally illustrates an exemplary architecture for a methodology where users utilizing electronic devices access, over the internet, a fantasy sports league management web site, hosted at a remote server, that itself interacts with a separate multiyear contract management website, hosted at a separate remote server, and FIG. 15B generally illustrates an exemplary architecture for a methodology where users utilizing electronic devices access, over the internet, a multiyear contract management web site, hosted at a remote server, that itself interacts with a separate fantasy sports league management website, hosted at a separate remote server, all in accordance with one or more alternative preferred embodiments of the present invention. Interaction between the fantasy sports league management web site and the separate multiyear contract management website may be facilitated, for example, through an API or other coordinating software.

Further, in accordance with one or more preferred implementations, features and functionality disclosed herein are provided by a fantasy sports league management app, e.g. an app for a phone, tablet, watch, gaming console, personal computer, or other electronic device.

Advantageously, the present invention may facilitate one or more of the following: the ability to offer manager-generated, multiyear contracts to players on website of fantasy sports provider or website communicating with provider; the ability to vote on contract offers by competing managers and to determine by those votes whether offers pass or fail on website of fantasy sports provider or website communicating with provider; the recording of contracts offered and voted on in order to calculate percentage of offers voted on by each manager on website of fantasy sports provider or website communicating with provider; the automatic enforcement of contracts and restriction of an owner's ability to offer contracts on website of fantasy sports provider or website communicating with provider; the automatic enforcement of rules regarding future owner obligations regarding contracts of players dropped from the owner's roster; and/or the automatic enforcement of rules regarding future owner obligations regarding contracts of players traded from one owner to another.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claim(s) appended hereto and the equivalents thereof.

What is claimed is:

1. A graphical user interface method involving a structured graphical user interface enabling unconventional functionality that provides a technical solution to the problem of how to require timely participation by users in proposal polling for fantasy sports league multiyear contracts, the method comprising:
   (a) displaying, to a first user via an electronic display associated with a first electronic device, a first interface of a fantasy sports league management website that includes a contract management user interface element for accessing a contract management interface, the first user being registered with the fantasy sports league management website as an owner of a first fantasy sports team belonging to a first fantasy sports league;
   (b) receiving, from the first user via one or more input devices, first user input representing interaction with the contract management user interface element;
   (c) displaying, to the first user via the electronic display associated with the first electronic device, a first contract management interface of the fantasy sports league management website that includes one or more user input elements configured to allow a user to select a player and specify a contract duration and contract amount for such selected player;
   (d) receiving, from the first user via one or more input devices associated with the first electronic device, second user input representing proposal of a first contract via selection of a first player and specification of a first contract duration and a first contract amount for the selected first player, the first contract duration being a duration longer than one year;
   (e) subsequently, for each of a first plurality of other respective users who are registered with the fantasy sports league management website as an owner of a fantasy sports team belonging to the first fantasy sports league,
      (i) displaying, to the respective user via an electronic display associated with a respective electronic device, an interface of the fantasy sports league management website that
         (A) displays an indication of the first player, the first contract duration, and the first contract amount, and
         (B) prompts the respective user to vote yes or no for the first contract for the first player at the first contract amount for the first contract duration, and
      (ii) receiving, from the respective user via one or more input devices associated with the respective electronic device, respective user input representing a vote of yes or no for the first contract for the first player at the first contract amount for the first contract duration;
   (f) electronically determining, at a server associated with the fantasy sports league management website, based on the respective user input representing a vote of yes or no received from each user of the first plurality of other respective users, that a number of yes votes has exceeded a set threshold number of votes; and
   (g) updating, based on the respective user input representing a vote of yes or no received from each user of the first plurality of other respective users,
      (i) a voting history of each user of the first plurality of other respective users to reflect participation in voting on the proposal for the first contract for the first player, and
      (ii) a voting history of each other user that was not part of the first plurality of other respective users to reflect a lack of participation in voting on the proposal for the first contract for the first player;
   (h) thereafter, displaying, to a second user via an electronic display associated with a second electronic device, the first interface of the fantasy sports league management website that includes the contract management user interface element for accessing the contract management interface, the second user being registered with the fantasy sports league management website as an owner of a second fantasy sports team belonging to the first fantasy sports league;
   (i) receiving, from the second user via one or more input devices, first user input representing interaction with the contract management user interface element;
   (j) determining, at a server associated with the fantasy sports league management website,
      (i) that a number of contract offers for which voting has occurred exceeds a set threshold number of contract offers, and
      (ii) that maintained voting history for the second user indicates vote participation below a set threshold vote participation percentage;
   (k) based on the determinations that a number of contract offers for which voting has occurred exceeds a set threshold number of contract offers and that maintained voting history for the second user indicates vote participation below a set threshold vote participation percentage, disabling contract offer functionality for the second user and displaying, to the second user via the electronic display associated with the second electronic device, a message explaining that offer functionality is disabled based on a lack of participation; and
   (l) for a next season of the first fantasy sports league, automatically counting the first contract amount for the first contract against a total salary amount of the first fantasy team;
   (m) wherein the automatic, real-time disabling of functionality for a user based on a lack of participation in polling for proposals of other users operates to dictate timely participation by users in proposal polling.

2. The method of claim 1, wherein electronically determining that the first contract should become official comprises determining that a number of yes votes exceeded a number determined based on a number of teams in the first league.

3. The method of claim 1, wherein electronically determining that the first contract should become official comprises determining that a number of yes votes exceeded a number determined based on a number of voting users in the first league.

4. The method of claim 1, wherein the electronic display associated with the first electronic device comprises an electronic display of a personal computer.

5. The method of claim 1, wherein the electronic display associated with the first electronic device comprises an electronic display of a phone.

6. The method of claim 1, wherein the electronic display associated with the first electronic device comprises an electronic display of a tablet.

7. The method of claim 1, wherein the electronic display associated with the first electronic device comprises an electronic display of a gaming console.

8. A graphical user interface method involving a structured graphical user interface enabling unconventional functionality that provides a technical solution to the problem of how to require timely participation by users in proposal polling for fantasy sports league multiyear contracts, the method comprising:

(a) displaying, to a first user via an electronic display associated with a first electronic device, a first interface of a fantasy sports league management app that includes a contract management user interface element for accessing a contract management interface, the first user being registered with the fantasy sports league management app as an owner of a first fantasy sports team belonging to a first fantasy sports league;

(b) receiving, from the first user via one or more input devices, first user input representing interaction with the contract management user interface element;

(c) displaying, to the first user via the electronic display associated with the first electronic device, a first contract management interface of the fantasy sports league management app that includes one or more user input elements configured to allow a user to select a player and specify a contract duration and contract amount for such selected player;

(d) receiving, from the first user via one or more input devices associated with the first electronic device, second user input representing proposal of a first contract via selection of a first player and specification of a first contract duration and a first contract amount for the selected first player, the first contract duration being a duration longer than one year;

(e) subsequently, for each of a first plurality of other respective users who are registered with the fantasy sports league management app as an owner of a fantasy sports team belonging to the first fantasy sports league, (i) displaying, to the respective user via an electronic display associated with a respective electronic device, an interface of the fantasy sports league management app that (A) displays an indication of the first player, the first contract duration, and the first contract amount, and (B) prompts the respective user to vote yes or no for the first contract for the first player at the first contract amount for the first contract duration, and (ii) receiving, from the respective user via one or more input devices associated with the respective electronic device, respective user input representing a vote of yes or no for the first contract for the first player at the first contract amount for the first contract duration;

(f) electronically determining, at a server associated with the fantasy sports league management app, based on the respective user input representing a vote of yes or no received from each user of the first plurality of other respective users, that a number of yes votes has exceeded a set threshold number of votes; and (g) updating, based on the respective user input representing a vote of yes or no received from each user of the first plurality of other respective users, (i) a voting history of each user of the first plurality of other respective users to reflect participation in voting on the proposal for the first contract for the first player, and (ii) a voting history of each other user that was not part of the first plurality of other respective users to reflect a lack of participation in voting on the proposal for the first contract for the first player;

(h) thereafter, displaying, to a second user via an electronic display associated with a second electronic device, the first interface of the fantasy sports league management app that includes the contract management user interface element for accessing the contract management interface, the second user being registered with the fantasy sports league management app as an owner of a second fantasy sports team belonging to the first fantasy sports league;

(i) receiving, from the second user via one or more input devices, first user input representing interaction with the contract management user interface element;

(j) determining, at a server associated with the fantasy sports league management app, (i) that a number of contract offers for which voting has occurred exceeds a set threshold number of contract offers, and (ii) that maintained voting history for the second user indicates vote participation below a set threshold vote participation percentage;

(k) based on the determinations that a number of contract offers for which voting has occurred exceeds a set threshold number of contract offers and that maintained voting history for the second user indicates vote participation below a set threshold vote participation percentage, disabling contract offer functionality for the second user and displaying, to the second user via the electronic display associated with the second electronic device, a message explaining that offer functionality is disabled based on a lack of participation; and (l) for a next season of the first fantasy sports league, automatically counting the first contract amount for the first contract against a total salary amount of the first fantasy team;

(m) wherein the automatic, real-time disabling of functionality for a user based on a lack of participation in polling for proposals of other users operates to dictate timely participation by users in proposal polling.

9. The method of claim 8, wherein the electronic display associated with the first electronic device comprises an electronic display of a phone.

10. The method of claim 8, wherein the electronic display associated with the first electronic device comprises an electronic display of a personal computer.

11. The method of claim 8, wherein the electronic display associated with the first electronic device comprises an electronic display of a tablet.

12. The method of claim 8, wherein the electronic display associated with the first electronic device comprises an electronic display of a gaming console.

13. The method of claim 8, wherein the electronic display associated with the first electronic device comprises an electronic display of a watch.

14. The method of claim 8, wherein the electronic display associated with one of the respective electronic devices comprises an electronic display of a phone.

15. The method of claim 8, wherein the electronic display associated with one of the respective electronic devices comprises an electronic display of a personal computer.

16. The method of claim 8, wherein the electronic display associated with one of the respective electronic devices comprises an electronic display of a tablet.

17. The method of claim 8, wherein the electronic display associated with one of the respective electronic devices comprises an electronic display of a gaming console.

18. The method of claim 8, wherein the electronic display associated with one of the respective electronic devices comprises an electronic display of a watch.

* * * * *